US006493046B1

(12) United States Patent
Ueda

(10) Patent No.: US 6,493,046 B1
(45) Date of Patent: Dec. 10, 2002

(54) LIQUID CRYSTAL DISPLAY DEVICE WITH CAPACITOR IN CONTACT HOLE, AND FABRICATION METHOD FOR THE SAME

(75) Inventor: Tohru Ueda, Fukuyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 135 days.

(21) Appl. No.: 09/604,676

(22) Filed: Jun. 27, 2000

(30) Foreign Application Priority Data

Jul. 2, 1999 (JP) .......................................... 11-188779

(51) Int. Cl.[7] .......................................... G02F 1/1343
(52) U.S. Cl. ........................................................ 349/38
(58) Field of Search .............................. 349/38, 42–52, 349/39, 111

(56) References Cited

U.S. PATENT DOCUMENTS

| 5,317,432 A | 5/1994 | Ino | 359/59 |
| 5,717,224 A | * | 2/1998 | Zhang | 257/57 |

FOREIGN PATENT DOCUMENTS

| JP | 5-61071 A | 3/1993 | |
| JP | 07-146491 | * 6/1995 | G02F/1/136 |

* cited by examiner

Primary Examiner—Toan Ton
Assistant Examiner—Timothy L Rude
(74) Attorney, Agent, or Firm—Nixon & Vanderhye P.C.

(57) ABSTRACT

A liquid crystal display device provided with an insulating substrate, a thin film transistor formed on the insulating substrate, and a pixel electrode and a storage capacitor electrically connected to the thin film transistor, includes a first conductive layer formed on the insulating substrate; a first insulating layer formed on the first conductive layer and having an opening for exposing a part of the first conductive layer; a second conductive layer formed on the first conductive layer at least within the opening; a second insulating layer for covering the second conductive layer; and a third conductive layer for covering the second insulating layer at least within the opening, and the storage capacitor is formed from a stacked layer structure including the second conductive layer, the second insulating layer and the third conductive layer.

12 Claims, 9 Drawing Sheets

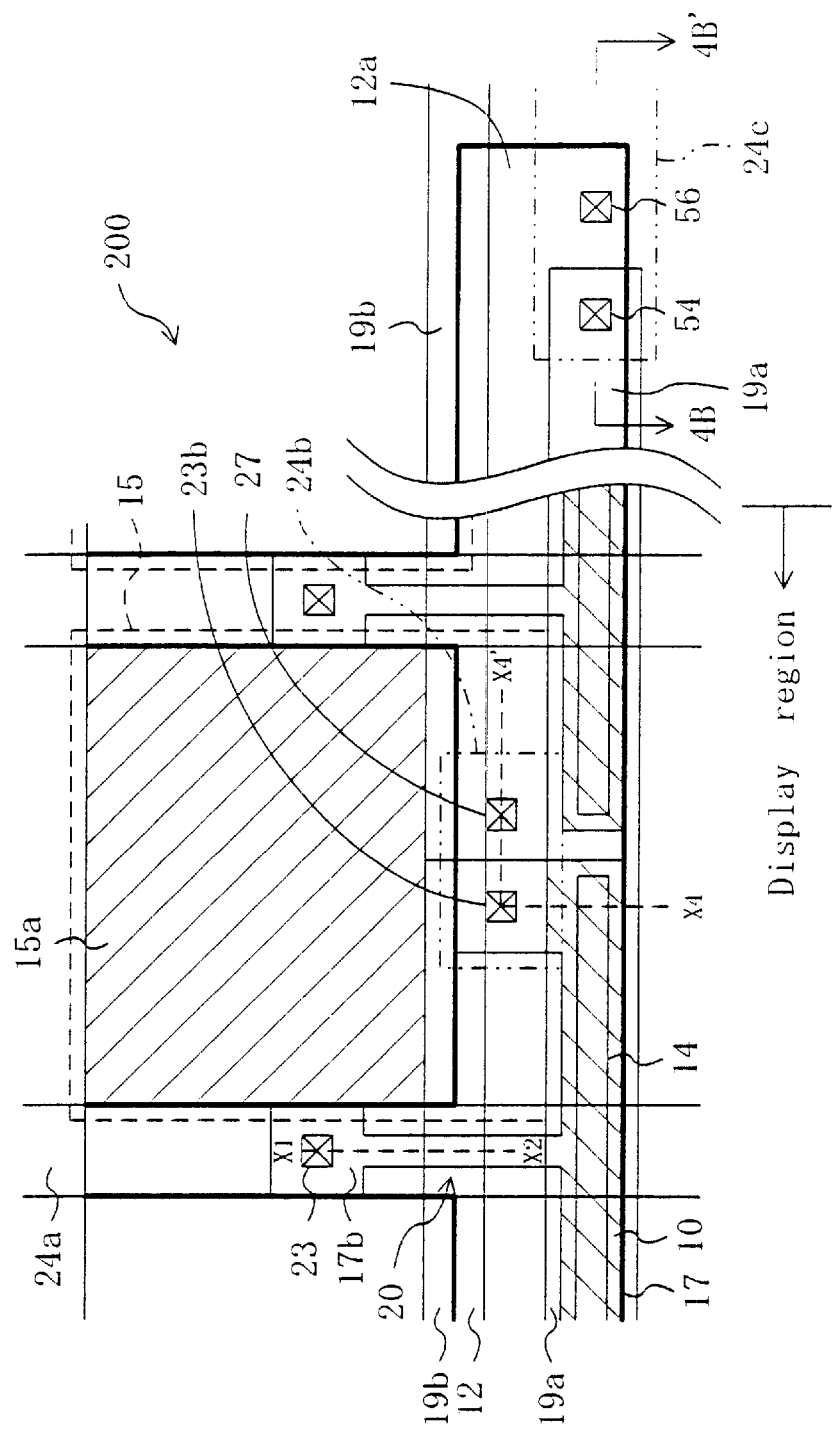

LIQUID CRYSTAL DISPLAY DEVICE WITH CAPACITOR IN CONTACT HOLE, AND FABRICATION METHOD FOR THE SAME

BACKGROUND OF THE INVENTION

The present invention relates to a liquid crystal display device and a fabrication method for the liquid crystal display device, and more particularly, it relates to an active matrix type liquid crystal display device including thin film transistors and a fabrication method for the same.

Recently, an active matrix type liquid crystal display device is widely used as a display device for a personal computer, a thin television set, a display for a video imaging device or a digital camera, or the like. An equivalent circuit of one pixel of an active matrix type liquid crystal display device including a thin film transistor as an active element (hereinafter referred to as the "TFT type liquid crystal display device") is shown in FIG. 6. An area where pixels (pixel regions) are arranged in the form of a matrix corresponds to a display region.

In the TFT type liquid crystal display device, each pixel includes a thin film transistor (hereinafter referred to as the "TFT"), and a liquid crystal capacitor $C_{LC}$ and a storage capacitor $C_S$ connected to the drain D of the TFT. The liquid crystal capacitor $C_{LC}$ and the storage capacitor $C_S$ are together designated as a pixel capacitor $C_{pix}$. To the gate G of the TFT, a gate line (scanning line) is connected, and to the source S thereof, a source line (signal line) is connected. During a period when a scan signal is applied to the gate G (i.e., during one scan period), a signal voltage applied from the source line to the source S of the TFT is applied to a drain side electrode of the liquid crystal capacitor $C_{LC}$ (hereinafter referred to as the "pixel electrode") and a drain side electrode of the storage capacitor $C_S$ (hereinafter referred to as the "storage capacitor electrode"). On the other hand, to another electrode of the liquid crystal capacitor $C_{LC}$ (hereinafter referred to as the "counter electrode") and another electrode of the storage capacitor $C_S$ (hereinafter referred to as the "storage capacitor counter electrode"), a predetermined counter voltage (common voltage) is applied through a counter electrode or storage capacitor counter electrode line (common line) COM. The storage capacitor counter electrode line COM formed on a TFT substrate is electrically connected to a counter electrode formed on a counter substrate. A net voltage applied to the liquid crystal capacitor $C_{LC}$ corresponds to a difference between the signal voltage and the counter voltage. The alignment of liquid crystal is changed in accordance with this voltage, so as to obtain a display state corresponding to the signal voltage.

In a period when a scan signal is not applied to the gate G (namely, when a TFT connected to another gate line is selected), the liquid crystal capacitor $C_{LC}$ and the storage capacitor $C_S$ are electrically insulated from the source line by the TFT. Until the TFT of interest is selected next, the liquid crystal capacitor $C_{LC}$ and the storage capacitor $C_S$ keep the predetermined display state by keeping the previously applied voltage. When the voltage holding property of the TFT and the pixel capacitor $C_{pix}$ is low during this period, the display quality is degraded.

In order to attain a desired voltage holding property, a storage capacitor $C_S$ having a comparatively large capacitance value is sometimes required. When the areas of the storage capacitor electrode and the storage capacitor counter electrode are increased in order to increase the capacity of the storage capacitor $C_S$, the aperture ratio can be degraded in a transmission type liquid crystal display device because these electrodes are generally formed from opaque materials.

Japanese Laid-Open Patent Publication No. 5-61071 discloses a TFT type liquid crystal display device using a storage capacitor having large capacity in a pixel. FIGS. 7A through 7C are cross-sectional views for showing procedures for forming a TFT and the storage capacitor of the liquid crystal display device described in this publication.

According to the publication, a groove (trench) 122 is formed in the surface of an insulating substrate 121 on which a TFT is to be formed, and the storage capacitor (capacity component) is formed in this groove 122. Furthermore, the storage capacitor is formed from a first electrode 123 formed integrally with a semiconductor layer of the TFT in the same procedure, a second electrode 126a formed from the same material as a gate electrode of the TFT and insulating films 124a and 125a formed from the same material as a gate insulating layer of the TFT. Thus, the structure and the fabrication process are simplified.

The TFT substrate including the TFT and the storage capacitor part shown in FIGS. 7A through 7C are fabricated as follows:

(1) A groove 122 is formed in the surface of a quartz substrate 121 through wet etching using a mixture of HF and $NH_4F$ (1:6) as an etchant.

(2) A first polysilicon layer 123 with a thickness of 80 nm is formed by the low pressure CVD. Silicon is implanted into the first polysilicon layer 123 twice at energy of 30 keV and dose of $1 \times 10^{15}/cm^2$ and at energy of 50 keV and dose of $1 \times 10^{15}/cm^2$, respectively. The resultant is subjected to solid phase annealing, and part of the first polysilicon layer 123 is removed by etching.

(3) The first polysilicon layer 123 is thermally oxidized at 1000° C., thereby forming a $SiO_2$ film 124 with a thickness of 50 nm in the surface thereof. A part of the first polysilicon layer 123 not oxidized is ultimately formed into a first electrode of the storage capacitor and the semiconductor layer (the source, the channel and the drain) of the TFT.

(4) With an area of the $SiO_2$ film 124 where the TFT is to be formed protected by a resist layer, arsenic ions ($As^+$) are implanted at energy of 30 kev and dose of $5 \times 10^{15}/cm^2$ into the part of the first polysilicon layer 123 to be formed into the first electrode of the storage capacitor.

(5) After removing the resist layer, a SiN film 125 with a thickness of 30 nm is formed by the low pressure CVD so as to cover the $SiO_2$ film 124.

(6) A second polysilicon layer 126 with a thickness of 350 nm is formed on the entire surface of the substrate by the low pressure CVD, and the resistance is reduced by PSG.

(7) The second polysilicon layer 126 and the SiN film 125 are patterned by using a gas including $CF_4$ and $O_2$ (95:5), thereby forming a gate electrode 126b of the TFT, a second electrode 126a of the storage capacitor, a SiN gate insulating layer 125b and a storage capacitor SiN film 125a. Then, arsenic ions are implanted through the $SiO_2$ film 124 into the first polysilicon layer 123 included in the TFT at energy of 160 keV and dose of $1 \times 10^{15}/cm^2$, thereby forming an LDD (lightly doped drain).

(8) A resist is formed so as to cover the second electrode 126b, and arsenic ions are implanted at energy of 140 keV and dose of $2 \times 10^{15}/cm^2$, thereby forming an n-channel. After removing the resist, another resist is formed on the entire surface, and boron ions (B$^+$) are implanted at energy of 30 keV and dose of $2\times10^{15}/cm^2$, thereby forming a p-channel.

(9) After removing the resist, an interlayer insulating film 131 of phosphorus silica glass (PSG) is formed by the low pressure CVD.

(10) A first contact hole 132 is formed in the interlayer insulating film 131 and the SiO$_2$ film 124 by the wet etching using the mixture of HF and NH$_4$F.

(11) An ITO (indium tin oxide) film 129 with a thickness of 140 nm is formed by sputtering at 400° C. The ITO film 129 is wet etched by using an etchant including HCl, H$_2$O and HNO$_3$ (300:300:50), thereby patterning the ITO film 129. Then, by using a resist as a mask, a second contact hole 134 is formed in the ITO film 129 by the wet etching using the mixture of HF and NH$_4$F.

(12) An AlSi layer with a thickness of 600 nm is deposited by sputtering on the entire surface, and the AlSi layer is patterned into an electrode 130 by the wet etching using a mixture of H$_3$PO$_4$ and H$_2$O (2:10). Then, a passivation film 133 of SiN with a thickness of 400 nm is formed by the atmospheric pressure CVD. The passivation film 133 is patterned by the plasma etching using a gas including CF$_4$ and O$_2$ (95:5).

The capacitance value of the storage capacitor of the liquid crystal display device disclosed in the above-described publication depends upon the dimension of the opening of the groove, the depth of the groove, the kind (dielectric constant) of material used for forming a dielectric layer and the thickness of the dielectric layer. The most significant factor in forming the storage capacitor having a desired capacitance value in this conventional technique is control of the depth of the groove. Since the groove is formed by etching the surface of the substrate made from a single material, the depth of the groove is controlled by adjusting the etch time. Even when the etch time is accurately adjusted, however, the depth of the groove may be varied if the etching rate is varied. Variation in the capacitance value of the storage capacitor degrades the display quality of the liquid crystal display device.

When the capacitance value is small, the storage capacitor can store small charge. Therefore, the storage capacitor is largely affected by a leakage current flowing through the TFT and hence cannot keep the predetermined voltage. On the contrary, when the capacitance value of the storage capacitor is large, the storage capacitor cannot be sufficiently charged, and hence, the predetermined voltage cannot be applied to the ends of the storage capacitor and the liquid crystal capacitor.

SUMMARY OF THE INVENTION

The present invention was devised to overcome the aforementioned conventional problems, and a main object is providing a liquid crystal display device and a fabrication method for the same in which the capacitance value of a storage capacitor is minimally varied so as to attain high display quality.

The liquid crystal display device of this invention including an insulating substrate, a thin film transistor formed on the insulating substrate, and a pixel electrode and a storage capacitor electrically connected to the thin film transistor, includes a first conductive layer formed on the insulating substrate; a first insulating layer formed on the first conductive layer and having an opening for exposing a part of the first conductive layer; a second conductive layer formed on the first conductive layer at least within the opening; a second insulating layer for covering the second conductive layer; and a third conductive layer for covering the second insulating layer at least within the opening, wherein the storage capacitor is formed from a stacked layer structure including the second conductive layer, the second insulating layer and the third conductive layer. Thus, the aforementioned object is achieved.

In the liquid crystal display device, the second conductive layer can be in contact with the first conductive layer within the opening.

The liquid crystal display device may further include a third insulating layer formed between the first conductive layer and the second conductive layer, and the first conductive layer and the second conductive layer can be electrically insulated from each other.

In the liquid crystal display device, the first conductive layer and the third conductive layer may be electrically connected to each other, and the storage capacitor can be formed from a stacked layer structure including the first conductive layer, the third insulating layer and the second conductive layer, and another stacked layer structure including the second conductive layer, the second insulating layer and the third conductive layer.

In the liquid crystal display device, the first conductive layer and the third conductive layer are preferably mutually connected within a contact hole formed in the first insulating layer in a position outside of a display region.

The liquid crystal display device may further include a shielding layer formed over at least a channel of the thin film transistor, and the shielding layer and the first conductive layer may be formed from the same film and electrically insulated from each other.

In the liquid crystal display device, a gate insulating layer of the thin film transistor is preferably formed from a film the same as a film used for forming the second insulating layer.

In the liquid crystal display device, a channel, a source and a drain of the thin film transistor are preferably formed in a film the same as a film used for forming the second conductive layer.

In the liquid crystal display device, a gate electrode of the thin film transistor is preferably formed from a film the same as a film used for forming the third conductive layer.

The method of this invention of fabricating a liquid crystal display device including an insulating substrate, a thin film transistor formed on the insulating substrate, and a pixel electrode and a storage capacitor electrically connected to the thin film transistor, includes the steps of forming a first conductive layer on the insulating substrate; forming a first insulating layer on the first conductive layer; forming an opening for exposing a part of the first conductive layer in the first insulating layer by etching the first insulating layer with the first conductive layer used as an etch-stop layer; forming a second conductive layer on the first conductive layer at least within the opening; forming a second insulating layer for covering the second conductive layer; and forming a third conductive layer for covering the second insulating layer at least with in the opening, wherein the storage capacitor is formed from a stacked layer structure including the second conductive layer, the second insulating layer and the third conductive layer. Thus, the aforementioned object is achieved.

The method of fabricating a liquid crystal display device may further include the steps of forming, between the first conductive layer and the second conductive layer, a third insulating layer for electrically insulating the first conductive layer and the second conductive layer from each other; and electrically connecting the first conductive layer and the third conductive layer to each other, and the storage capacitor can be formed from a stacked layer structure including the first conductive layer, the third insulating layer and the second conductive layer, and a stacked layer structure including the second conductive layer, the second insulating layer and the third conductive layer.

Thus, the present invention can realize a storage capacitor having a large capacitance value with occupying a small area in which variation in the capacitance value is greatly reduced. As a result, the invention provides a liquid crystal display device having a high aperture ratio (namely, high brightness) and high picture quality.

Also, since the liquid crystal display device of this invention has a simple structure, the fabrication procedures can be simplified, so that a liquid crystal display device having high picture quality can be fabricated at low cost and high yield. The liquid crystal display device of this invention is suitably applied to a comparatively compact and highly refined liquid crystal display device using polysilicon as a semiconductor layer of a TFT.

BRIEF DESCRIPTION OF THE DRAWINGS

FIG. 5 is a schematic top view of one pixel part and the connecting part of FIG. 4B in the TFT liquid crystal display device of Embodiment 2;

DESCRIPTION OF THE PREFERRED EMBODIMENTS

Figure 1:
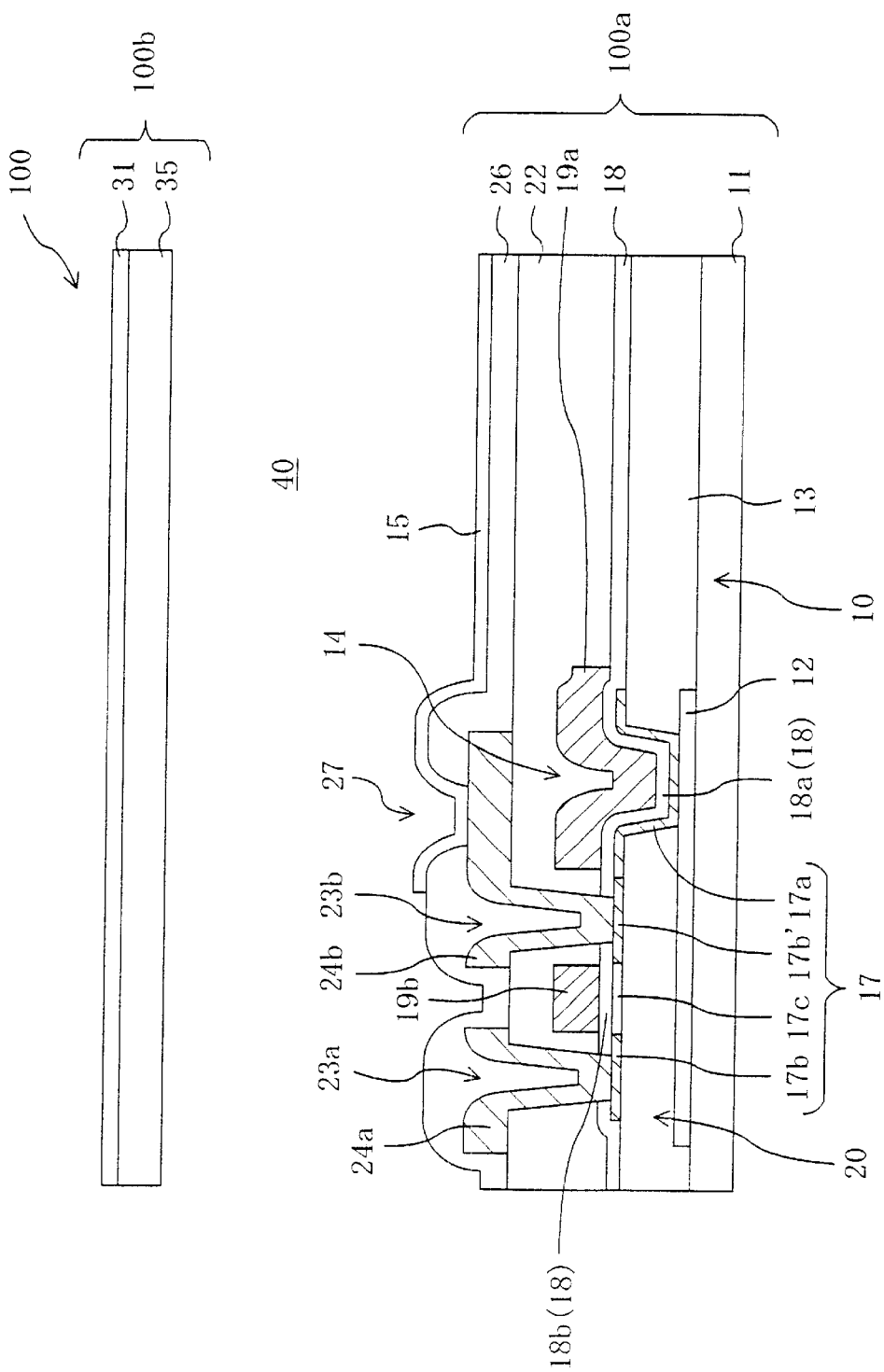
FIG. 1 is a schematic cross-sectional view of a TFT liquid crystal display device according to Embodiment 1 of the invention.

A storage capacitor of a liquid crystal display device of this invention is made from a stacked layer structure that is formed at least in an opening (groove or trench) and includes a second conductive layer (storage capacitor electrode), a second insulating layer (storage capacitor dielectric layer) and a third conductive layer (storage capacitor counter electrode). Since the storage capacitor is formed in the opening, it can attain a large capacitance value while occupying a small area. Furthermore, the opening is formed in a first insulating layer formed on a first conductive layer. Since the first conductive layer and the first insulating layer are made from different materials, the underlying first conductive layer can function as an etch-stop layer in forming the opening in the first insulating layer by etching. Accordingly, the depth of the opening where the storage capacitor is formed can be accurately controlled, and hence, variation in the capacitance value of the storage capacitor can be greatly reduced.

The second conductive layer can be formed so as to be in contact with the first conductive layer within the opening, or the first conductive layer and the second conductive layer can be insulated from each other by forming an additional insulating layer on the first conductive layer within the opening. In the case where the first conductive layer and the second conductive layer within the opening are insulated from each other by the additional insulating layer, not only a capacitor formed from the second conductive layer (storage capacitor electrode), the second insulating layer (storage capacitor dielectric layer) and the third conductive layer (storage capacitor counter electrode) but alsoa capacitor formed from the first conductive layer (storage capacitor counter electrode), the additional insulating layer (storage capacitor dielectric layer) and the second conductive layer (storage capacitor electrode) are connected to each other in parallel by electrically connecting the first conductive layer and the third conductive layer. Accordingly, a capacitance value per unit occupied area can be increased. In other words, the aperture ratio of the liquid crystal display device can be further increased. When the first conductive layer and the third conductive layer are electrically connected in a position not overlapping a pixel electrode, decrease of the aperture ratio can be avoided.

When the first conductive layer is formed from a material having a light shielding property, the first conductive layer can be used as a shielding layer for preventing light from entering a channel of a TFT. In particular, when the shielding layer is formed so as to cover at least the channel of the TFT or an LDD region of an LDD transistor, light leakage of the TFT can be suppressed. In accordance with the application of the liquid crystal display device, reflected light from an optical system or the like provided on the back surface or direct incident light from the top surface can be shielded.

When the first conductive layer is used as a storage capacitor counter electrode, a portion functioning as the storage capacitor counter electrode and a portion functioning as the shielding layer are preferably electrically separated from each other. The potential of the storage capacitor counter electrode can be prevented from affecting the channel of the TFT by separating at least a portion covering the channel of the TFT from the storage capacitor counter electrode, and this results in stabilizing the operation characteristic of the TFT.

Furthermore, when a layer functioning as the storage capacitor electrode and a semiconductor layer of the TFT (namely, a layer where the channel, the source and the drain are to be formed) are formed from the same film, the fabrication method for the liquid crystal display device can be simplified. For example, the storage capacitor electrode and the channel, the source and the drain of the TFT can be obtained by forming regions having different impurity concentrations in a polysilicon film.

Moreover, when a layer functioning as the storage capacitor dielectric layer and a gate insulating layer of the TFT are formed from the same film, the fabrication method for the liquid crystal display device can be simplified. In addition, when a layer functioning as the storage capacitor counter electrode and a gate electrode are formed from the same film, the fabrication method for the liquid crystal display device can be also simplified.

Now, preferred embodiments of the liquid crystal display device and the fabrication method of this invention will be described with reference to the accompanying drawings.

Embodiment 1

Figure 2A:
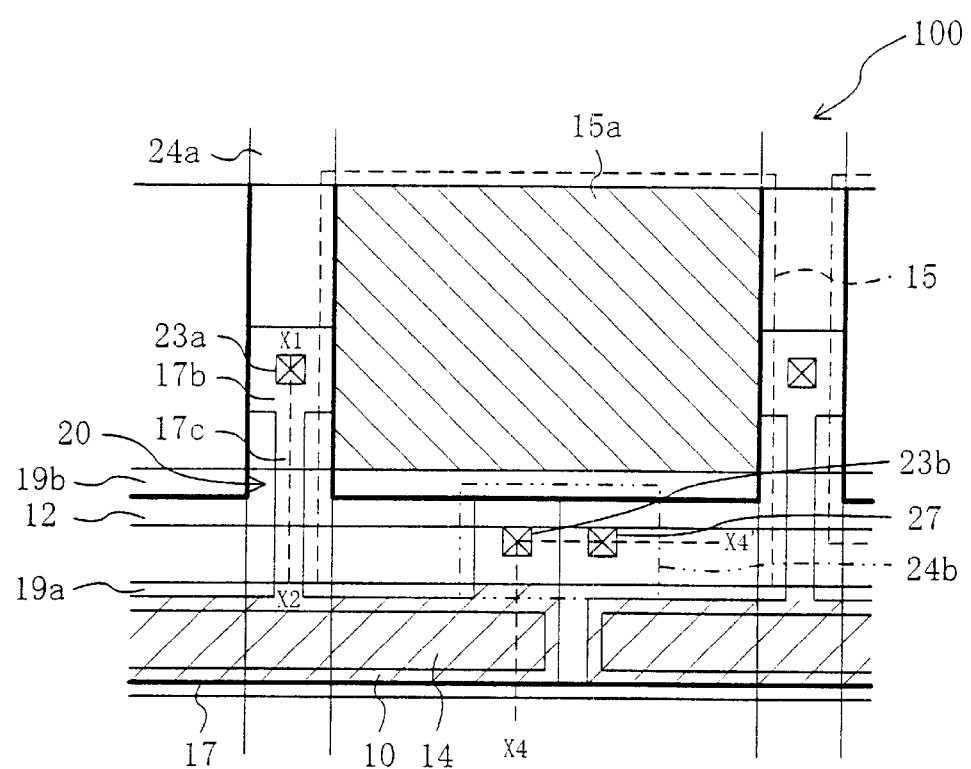
FIG. 2A is a schematic top view of one pixel part of the TFT liquid crystal display device of Embodiment 1.

FIGS. 1 and 2A schematically show a TFT liquid crystal display device (hereinafter referred to as the "TFT-LCD") 100 of this embodiment. FIG. 1 is a schematic cross-sectional view of a part corresponding to one pixel of the TFT-LCD 100, and FIG. 2A is a top view there of. FIG. 1 corresponds to a cross-sectional view taken on broken line X1–X2–X4–X4' of FIG. 2A. An equivalent circuit of the TFT-LCD of this invention is the same as the equivalent circuit shown in FIG. 6, and the composing elements used in the description of the conventional technique are similarly referred to in the description of the invention.

The TFT-LCD 100 includes a TFT substrate 100a, a counter substrate 100b and a liquid crystal layer 40 sandwiched between the TFT substrate 100a and the counter substrate 100b. In a general TN mode liquid crystal display device, alignment films (not shown) are respectively provided on the surfaces of the TFT substrate 100a and the counter substrate 100b opposing the liquid crystal layer 40, and polarizing plates (not shown) are respectively provided on the outside of the TFT substrate 100a and the counter substrate 100b. In another display mode, the alignment films and the polarizing plates can be omitted.

The TFT substrate 100a includes an insulating substrate 11, a TFT 20 formed on the insulating substrate 11, and a pixel electrode 15 and a storage capacitor 10 electrically connected to the TFT 20.

The storage capacitor 10 is formed from a stacked layer structure including, in this order, a first conductive layer 12 formed on the insulating substrate 11, a first insulating layer 13 having an opening (also designated as a groove or a trench) 14 for exposing a part of the first conductive layer 12, a second conductive layer 17a in contact with the first conductive layer 12 within the opening 14, a second insulating layer 18 for covering the second conductive layer 17a and a third conductive layer 19a covering the second insulating layer 18 at least within the opening 14. In other words, the storage capacitor 10 includes a storage capacitor electrode formed from the second conductive layer 17a, a storage capacitor counter electrode (storage capacitor counter electrode line) formed from the third conductive layer 19a and a storage capacitor dielectric layer formed from the second insulating layer 18 disposed between these electrodes. The storage capacitor 10 is formed in a hatched region of FIG. 2A where the second conductive layer 17 and the third conductive layer 19a overlap each other.

The TFT 20 includes a semiconductor layer 17 having a source 17b, a drain 17b' and a channel 17c, the second insulating layer (gate insulating layer) 18 formed on the semiconductor layer 17, and a gate electrode 19b formed on the second insulating layer 18 to be positioned directly above the channel 17c. The gate electrode 19b is formed as part of a gate line.

The TFT 20 and the storage capacitor 10 are covered with an insulating layer 22. In the insulating layer 22, contact holes 23a and 23b are formed so as to expose at least part of the source 17b and the drain 17b', respectively. The source 17b and the drain 17b' are connected to a source electrode 24a and a drain electrode 24b within the contact holes 23a and 23b, respectively. In a passivation layer 26 covering all of these elements, a contact hole 27 for exposing part of the drain electrode 24a is formed. The pixel electrode 15 formed on the passivation layer 26 is electrically connected to the drain electrode 24b within the contact hole 27.

The counter substrate 100b includes an insulating substrate 31 and a counter electrode (common electrode) 35 formed on the insulating substrate 31. An alignment layer and a color filter layer (neither shown) may be provided if necessary.

Figure 6:
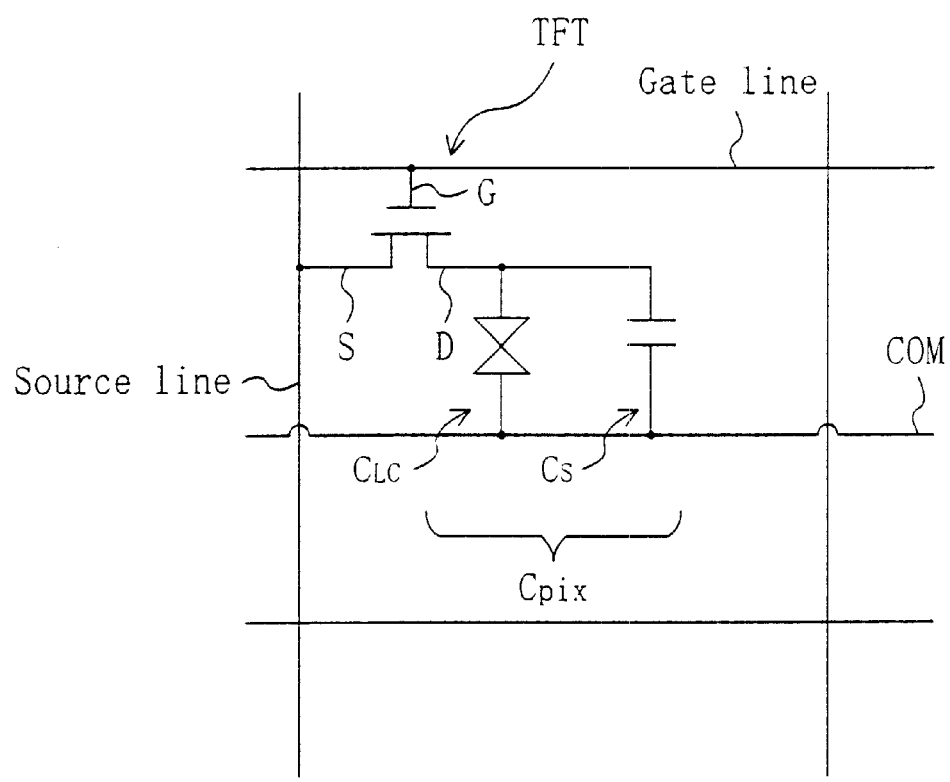
FIG. 6 is a diagram of an equivalent circuit of one pixel of a TFT liquid crystal display device.
Figure 7A:
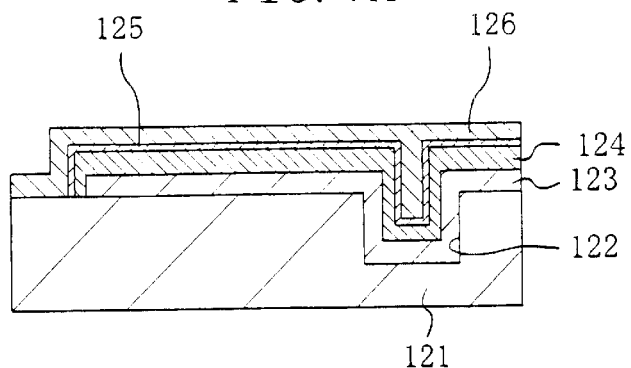
FIGS. 7A, 7B and 7C are cross-sectional views for showing procedures for forming a TFT and a storage capacitor of a conventional TFT liquid crystal display device.
Figure 7B:
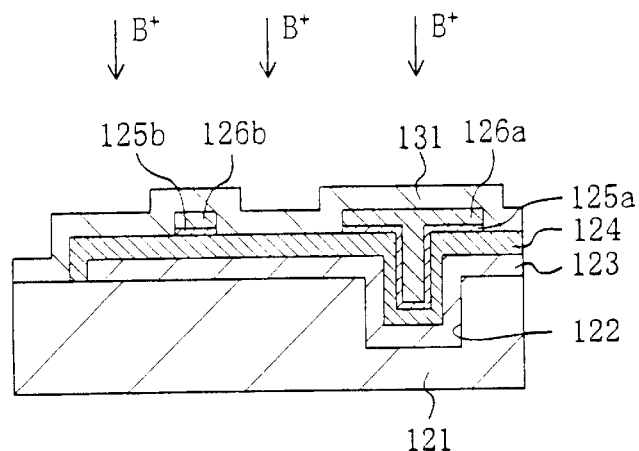
Figure 7C:
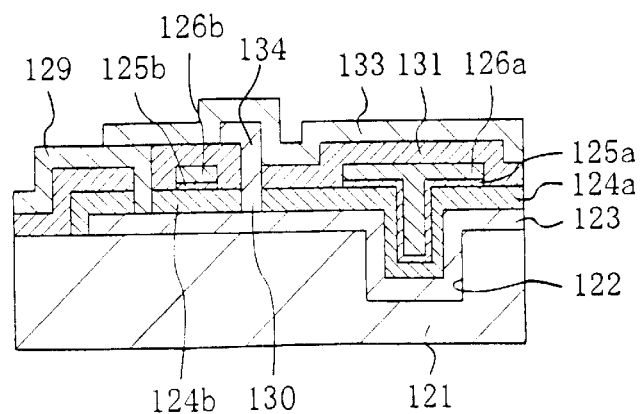

The liquid crystal capacitor $C_{LC}$ of the equivalent circuit of FIG. 6 is formed from the pixel electrode 15, the counter electrode 35 and the liquid crystal layer 40 sandwiched between these electrodes. A signal voltage is applied to the pixel electrode 15 and the storage capacitor electrode (second conductive layer) 17a through the drain 17b' of the TFT 20, and a common voltage is applied to the counter electrode 35 and the storage capacitor counter electrode 19a through a common line (shown with the reference numeral 19a in FIG. 2A). The common line may be grounded.

The storage capacitor 10 of the TFT-LCD 100 is formed in the vicinity of the TFT 20 in each pixel. Since the storage capacitor 10 is formed from the stacked layer structure including the second conductive layer (storage capacitor electrode) 17a, the second insulating layer (storage capacitor dielectric layer) 18a and the third conductive layer (storage capacitor counter electrode) 19a, a large capacitance value can be attained while occupying a small area (area projected on the substrate surface), all of which are stacked within the opening 14 formed in the insulating layer 13. Accordingly, a high aperture ratio can be attained.

Figure 2B:
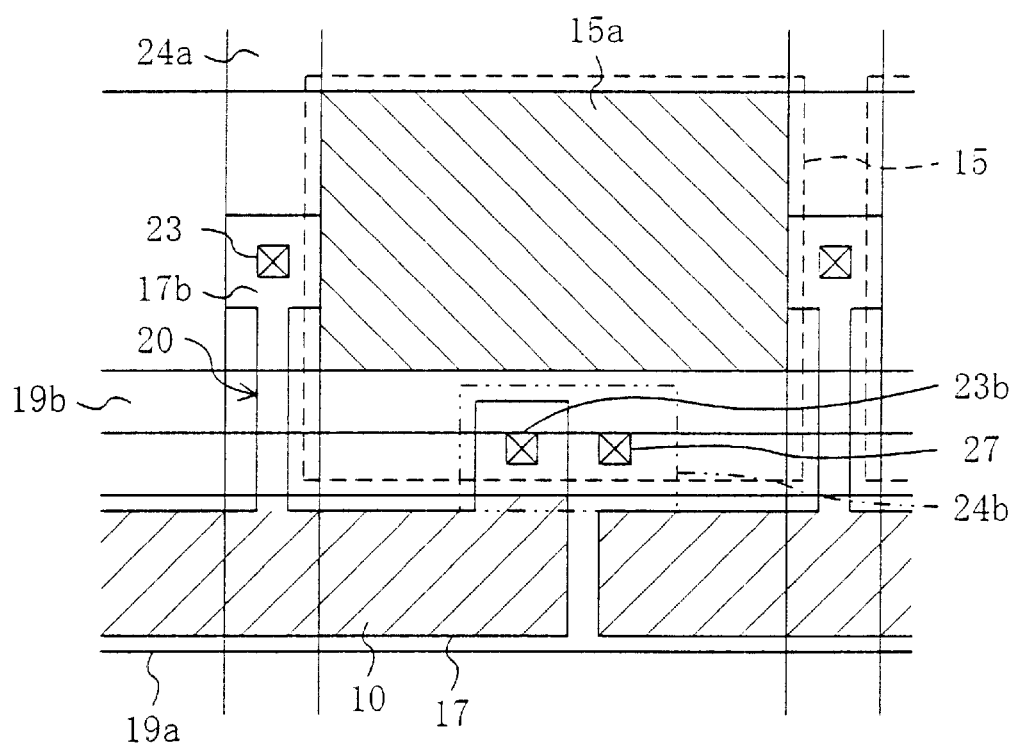
FIG. 2B is a schematic top view of one pixel part of a TFT liquid crystal display device of a comparative example.

The effect to increase the aperture ratio will now be quantitatively described by comparing the aperture ratio attained by the invention with that of a TFT-LCD including a storage capacitor without forming the opening as is shown in FIG. 2B. The TFT-LCD of FIG. 2B is substantially the same as the TFT-LCD 100 of FIG. 2A except that the opening is not formed in the first insulating layer 13, and hence, like reference numerals are used in FIG. 2B to refer to like elements shown in FIG. 2A and the detailed description is omitted.

In a TFT-LCD, assuming that an off current off of a transistor is 0.04 pA, an off period toff of the transistor is 16.7 msec. (when driven at 60 Hz) and an initial voltage vapp is 9 V, in order to obtain a voltage holding ratio of, for example, 99.5% or more (where voltage decrease ΔV in one frame period is less than 0.5%), it can be estimated, on the basis of the relationship of $\Delta V \sim \{(½) \times off \times toff\}/Cs\ Vapp \times (0.5/100)$, that a storage capacitance value Cs of approximately 30 fF or more is necessary. It goes without saying that this condition can be varied depending upon the driving method of the TFT-LCD, the liquid crystal capacity and/or the source-drain capacity of the TFT.

Assuming that a pixel has a size of 18 μm×18 μm and the storage capacitor dielectric layer (silicon oxide) has a thickness of 80 nm, these TFT-LCDs are compared in the area of the storage capacitor 10 projected onto the substrate surface (the hatched area of FIG. 2A or 2B) required for attaining the storage capacitance value Cs of 30 fF. The storage capacitor provided without forming the opening structure (trench structure) of FIG. 2B requires a projected area of approximately 70 μm², but the structure including the opening 14 with a width of 2 μm and a length of 17 μm of Embodiment 1 shown in FIG. 2A can attain the storage capacitance value of 30 fF with occupying a projected area of merely approximately 53 μm². When these TFT-LCDs are compared in the aperture ratio (corresponding to a ratio of an opening portion 15a (hatched portion) of FIG. 2A or 2B to the entire area of the pixel), the aperture ratio is approximately 42% in the structure of FIG. 2B but is approximately 46% in the structure of FIG. 2A. Thus, the aperture ratio is increased in the structure of this embodiment.

Furthermore, the opening 14 is a hole penetrating the insulating layer 13 and the conductive layer 12 is formed under the insulating layer 13 (namely, at the bottom of the opening 14). Accordingly, the conductive layer 12 can be used as an etch-stop layer in forming the opening 14 in the insulating layer 13 by etching. As a result, the problem of the conventional trench type storage capacitor that the capacitance value is varied because of difficulty in controlling the depth of the groove can be avoided.

Moreover, when the conductive layer 12 is formed from a material having a light shielding property so as to extend to a portion below the TFT 20 as is shown in FIG. 1, light can be prevented from entering the TFT 20 (the channel 17c, in particular). In other words, the conductive layer 12 can function not only as an etch-stop layer in the fabrication but also as a shielding layer in the final product.

In the structure shown in FIG. 1, the second conductive layer 18 is in contact with the first conductive layer 12 within the opening 14, but the first conductive layer 12 can be electrically insulated from the second conductive layer 18 by forming an insulating layer between the first conductive layer 12 and the second conductive layer 18. For example, when the first conductive layer 12 is to be used as a film for shielding the TFT 20 as described above, the first conductive layer 12 is preferably insulated so that the potential of the first conductive layer 12 cannot affect the operation of the TFT 20. Instead of forming an insulating layer between the first conductive layer 12 and the second conductive layer 18, the first conductive layer 12 may be divided as described in Embodiment 2 below. It is noted, however, that the structure in which the second conductive layer 18 is in contact with the first conductive layer 12 within the opening 14 is advantageous in accurately controlling the depth of the opening 14. This is because variation in the thickness of the insulating film formed within the opening 14 can slightly vary the depth of the opening 14.

Furthermore, when the structure of FIG. 1 is employed, the storage capacitor electrode 17a of the storage capacitor 10 and the semiconductor layer (including the source 17b, the drain 17b' and the channel 17c) of the TFT 20 can be formed from the same film. Specifically, while a part of one continuous semiconductor film is used as the storage capacitor electrode 17a, another part thereof can be used as the semiconductor layer of the TFT 20. In addition, the dielectric layer 18a of the storage capacitor 10 and the gate insulating layer 18b of the TFT 20 can be formed from the same film. Moreover, the storage capacitor 10 counter electrode 19a and the gate electrode 19b can be formed from the same film.

The method of fabricating the TFT-LCD 100 will now be described with reference to FIGS. 3A through 3G.

Figure 3A:
FIGS. 3A, 3B, 3C, 3D, 3E, 3F and 3G are cross-sectional views for showing procedures in a method of fabricating the TFT liquid crystal display device of Embodiment 1.

As is shown in FIG. 3A, a polysilicon layer (first conductive layer) 12 doped with phosphorus and having a thickness of approximately 100 nm is deposited on a quartz substrate (insulating substrate) 11 by the low pressure CVD. The resultant polysilicon layer 12 is etched into a desired pattern.

The material for the first conductive layer 12 is not limited to polysilicon. When the first conductive layer 12 is to be used as a shielding film for a TFT, it can be made from a metal such as W, Mo, Ti, Ta, Cr, Co, Pt, Ru, Pd and Cu; or any polycide of Mo, Ti, Ta, Cr, Co, Pt and Pd including W polycide ($WSi_x$/polysilicon). Alternatively, the first conductive layer 12 may be formed from an alloy such as TiW or conductive metal nitride such as TiN. The material for the first conductive layer 12 is appropriately selected in consideration of the heat resistance against a heat treatment conducted in a later procedure and the application of the liquid crystal display device. In particular, when the TFT-LCD 100 is used as a projection type display device, the TFT 20 is irradiated with intense light, and hence, the first conductive layer 12 preferably has light transmittance of 5% or less. A leakage current of the TFT 20 derived from light irradiation can be reduced by shielding at least the channel 17c of the TFT 20. The first conductive layer 12 may be formed so as to shield the entire TFT 20 in order to sufficiently reduce the leakage current. The size and the shape of the first conductive layer 12 are appropriately determined depending upon the application of the TFT-LCD 100.

Figure 3B:
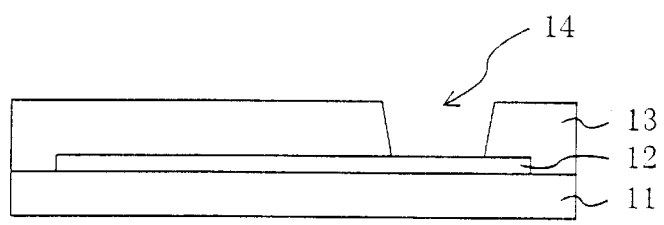

Next, as is shown in FIG. 3B, a $SiO_2$ layer 13 with a thickness of 400 nm is deposited by the low pressure CVD. The resultant SiO2 layer 13 is etched, so as to form an opening 14 with a width of 2 $\mu$m and a length of 17 $\mu$m in the first polysilicon layer 12. The thickness of the $SiO_2$ layer 13 and the size of the opening 14 are appropriately determined in consideration of the capacitance value and the aperture ratio. The width (shown as W in FIG. 3D) and the length of the opening 14 are defined based on the dimension on the first conductive layer 12. Now, the formation of the opening 14 will be specifically described.

A resist layer (not shown) having a predetermined pattern is formed on the $SiO_2$ layer 13. By using the resist layer as a mask, the $SiO_2$ layer 13 is etched by dry etching using $CHF_3/CF_4$/Ar (=8:1:12) as an etching gas. The etching rate ratio (etch selectivity) between $SiO_2$ and polysilicon is approximately 20:1, and hence, the first conductive layer 12 of polysilicon satisfactorily works as an etch-stop layer in etching the $SiO_2$ layer 13. Even when the $SiO_2$ layer with a thickness of 400 nm is over-etched by 20%, the thickness of the polysilicon layer 12 to be over-etched is 2 nm at most. Since variation in the etching rate is approximately 10%, variation in the thickness to be over-etched is approximately 0.4 nm. The variation in the thickness of the opening 14 caused in this etching is ignorable as compared with the variation in the thickness of the $SiO_2$ layer 13 caused during the deposition (that is, approximately 10% corresponding to approximately 40 nm in this case). Thus, the variation caused in the etching cannot be a factor in causing the variation in the depth of the opening 14.

In wet etching using an etchant like a mixture of HF and $NH_4F$, the etch selectivity between $SiO_2$ and polysilicon can be regarded infinite. Accordingly, the variation in the depth caused in the etching is further smaller in the wet etching, but the dry etching is preferably employed in consideration of etching accuracy in the two-dimensional direction. Furthermore, as the material for the first conductive layer 12 having a light shielding property, a double layer structure of silicide/polysilicon such as WSi/polysilicon (150 nm/100 nm) can be used. In this case, the first insulating layer is preferably a $SiO_2$ layer in view of the transparency but may be a SiN layer.

Figure 3C:
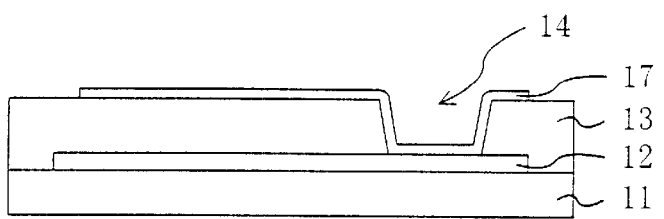

As is shown in FIG. 3C, polysilicon with a thickness of approximately 50 nm is deposited on the entire surface of the substrate by, for example, the low pressure CVD and then patterned, thereby forming a polysilicon layer (second conductive layer) 17. The polysilicon layer 17 is in contact with and electrically connected to the first conductive layer 12 within the opening 14. This polysilicon layer 17 is ultimately formed into a semiconductor layer (including a source 17b, a drain 17b' and a channel 17c) of a TFT and a storage capacitor electrode 17a of a storage capacitor.

Figure 3D:
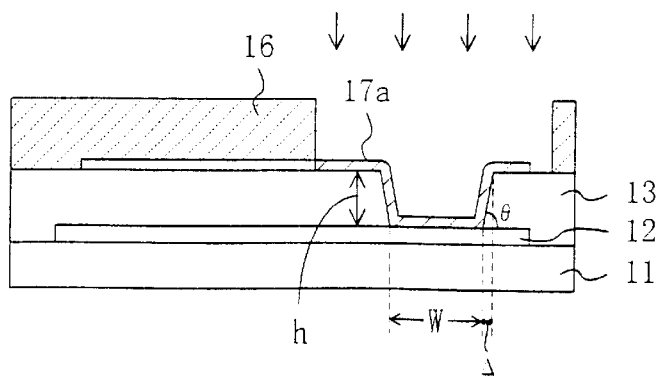

As is shown in FIG. 3D, by using, as a mask, a resist layer 16 for covering a portion for forming a TFT part, phosphorus (P) is implanted into the polysilicon layer 17 under conditions of, for example, energy of 15 keV and dose of $2 \times 10^{15}/cm^2$. In order to sufficiently implantions in to a portion of the polysilicon layer 17 formed on the wall of the opening 14, the opening 14 is preferably in a tapered shape. The taper angle θ (corresponding to an angle between the top surface of the first conductive layer 12 and the wall of the opening 14) is preferably 45°θ84°. The amount of phosphorus implanted into the portion of the polysilicon layer 17 formed on the wall of the opening 14 corresponds to cos θ times as much as the amount of phosphorus implanted into a portion of the polysilicon layer 17 formed on the bottom of the opening 14. In order to sufficiently reduce the resistance of the portion of the polysilicon layer 17 formed on the wall, the amount implanted into the wall portion is preferably approximately one tenth or more of the amount implanted into the bottom portion, and the taper angle θ is preferably 84° or less. In a high temperature heat treatment (at approximately 800° C. or more) conducted in a later procedure, the impurity included in the portion of the polysilicon layer 17 formed on the bottom is diffused so as to reduce the resistance of the portion of the polysilicon layer 17 formed on the wall, and therefore, the taper angle θ may exceed 84° in some cases. On the other hand, when the taper angle θ is too small, the expansion (shown as Δ in FIG. 3D) is too large. Specifically, the width of the polysilicon layer (second conductive layer) 17 becomes so large at the uppermost portion thereof that the aperture ratio is lowered. In consideration of the aperture ratio, the expansion Δ is preferably smaller than the thickness h of the $SiO_2$ layer (first insulating layer) 13, namely, the taper angle θ is preferably 45° or more.

Figure 3E:
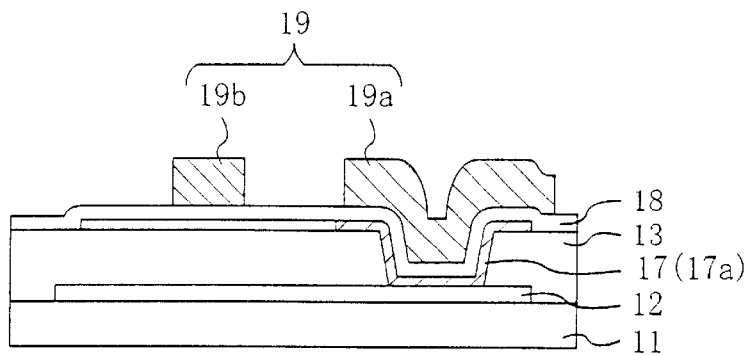

As is shown in FIG. 3E, a $SiO_2$ film (second insulating layer) 18 with a thickness of approximately 80 nm is formed by, for example, the CVD so as to cover the second conductive layer 17. Alternatively, the second insulating layer 18 can be formed by oxidizing the second conductive layer 17 previously formed in a large thickness. Further alternatively, the second insulating layer 18 of silicon oxide may be formed by thermal oxidation with the second conductive layer 17 formed from polysilicon, or the second insulating layer 18 of $Ta_2O_5$ may be formed by anode oxidation with the second conductive layer 17 formed from Ta. Furthermore, the second insulating layer 18 may be formed from a stacked film including $SiN/SiO_2$ or the like, or a film with a large dielectric constant such as $Ta_2O_5$. The second insulating layer 18 functions as a storage capacitor dielectric layer 18a and a gate insulating layer 18b.

Next, a polysilicon layer (third conductive layer) 19 doped with phosphorus and having a thickness of approximately 300 nm is formed and patterned into a storage capacitor counter electrode 19a and a gate electrode 19b.

Figure 3F:
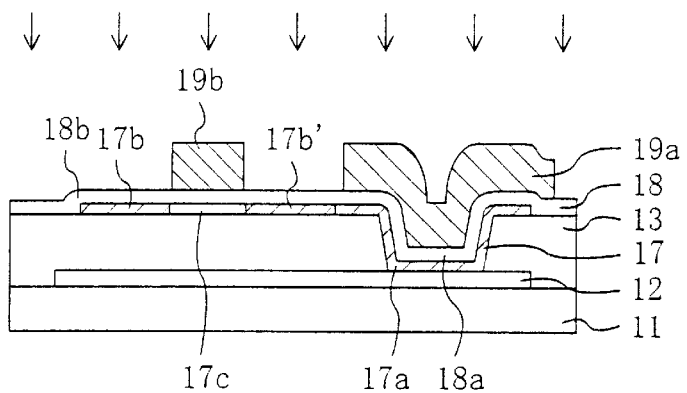

As is shown in FIG. 3F, by using the polysilicon layer (third conductive layer) 19 as a mask, ions are implanted into the second conductive layer (polysilicon layer) 17, thereby forming the source 17b and the drain 17b'. This ion implantation can be carried out by implanting phosphorus at energy of 100 keV and dose of $2 \times 10^{15}/cm^2$. Alternatively, an LDD structure may be formed as in the conventional technique.

Figure 3G:
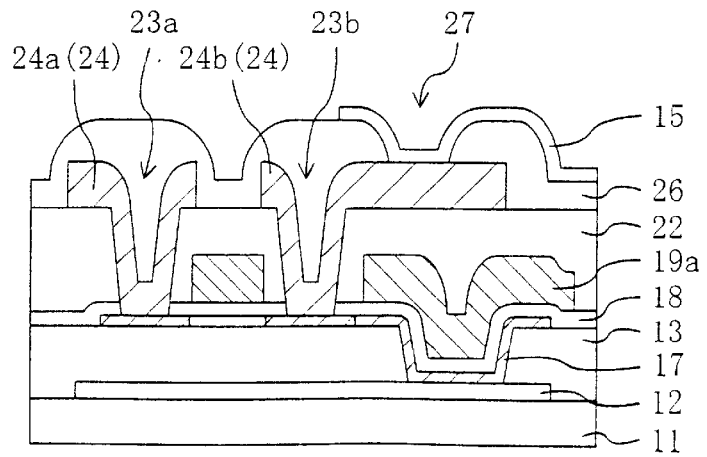

As is shown in FIG. 3G, after depositing a $SiO_2$ layer (interlayer insulating layer) with a thickness of approximately 600 nm by the CVD, a heat treatment is conducted at approximately 850° C. for 1 hour for activating the impurity. Thereafter, contact holes 23a and 23b respectively reaching the source 17b and the drain 17b' of the second conductive layer 17 are formed. Next, an AlSi layer 24 with a thickness of, for example, 400 nm is deposited and patterned into a source electrode 24a and a drain electrode 24b. In this procedure, a source line (not shown) can be formed integrally with the source electrode 24a.

A passivation film 26 of SiN is formed by the plasma CVD so as to cover substantially the entire surface of the substrate. After forming a contact hole 27 reaching the drain electrode 24b in the passivation film 26, an ITO film is deposited and patterned into a pixel electrode 15.

The individual procedures (deposition of a film, ion implantation, etching and the like) in the aforementioned method can be carried out by any of known methods.

As described above, in the fabrication method of this embodiment, the first conductive layer 12 (naturally formed from a different material from the first insulating layer) formed under the first insulating layer 13 is used as the etch-stop layer in the etching for forming the opening 14 in the first insulating layer. Therefore, the controllability of the etching depth can be very high as compared with that in the aforementioned conventional technique. Accordingly, the depth of the opening 14 where the storage capacitor is to be formed is determined substantially depending upon the thickness of the first insulating layer 13. As compared with the variation in etching the substrate in the conventional technique, the variation in the thickness caused in depositing the insulating layer in this embodiment is as small as approximately 10%. As a result, in a TFT-LCD fabricated by the method of this embodiment, the capacitance value of the storage capacitor is minimally varied so that good display quality can be attained.

Moreover, the storage capacitor electrode 17a of the storage capacitor 10 and the semiconductor layer (including the source 17b, the drain 17b' and the channel 17c) of the TFT 20 can be formed from the same layer. Also, the dielectric layer 18a of the storage capacitor 10 and the gate insulating layer 18b of the TFT 20 can be formed from the same layer. Additionally, the storage capacitor counter electrode 19a and the gate electrode 19b can be formed from the same layer. As a result, the fabrication process can be simplified, so as to lower the fabrication cost of the liquid crystal display device.

Embodiment 2

The structure and fabrication method of a TFT-LCD 200 according to Embodiment 2 will now be described with reference to FIGS. 4A, 4B and 5. The TFT-LCD 200 of this embodiment is different from the TFT-LCD 100 of Embodiment 1 in the structure of the storage capacitor. In the following description, like reference numerals are used to refer to composing elements having substantially the same functions as those of the TFT-LCD 100 of Embodiment 1, and the description is omitted.

Figure 4A:
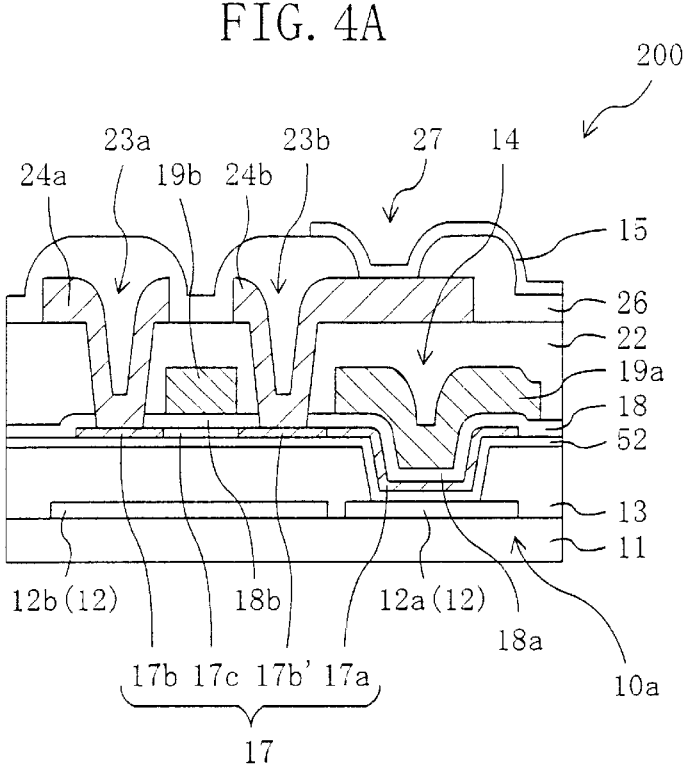
FIG. 4A is a schematic cross-sectional view of a part including a storage capacitor and a TFT of a TFT liquid crystal display device according to Embodiment 2 of the invention.
Figure 4B:
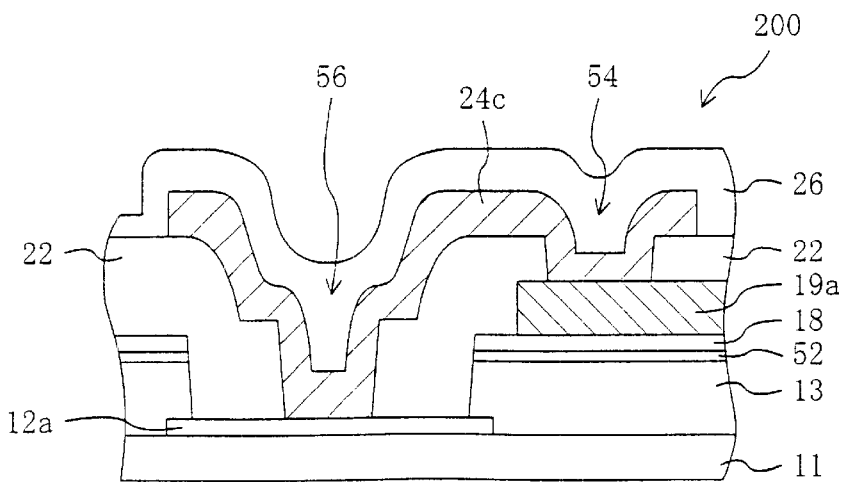
FIG. 4B is a schematic cross-sectional view of a connecting part between a first conductive layer and a third conductive layer in the TFT liquid crystal display device of Embodiment 2.

FIG. 4A is a schematic cross-sectional view of a part of the TFT-LCD 200 including a storage capacitor 10a and a TFT 20, and corresponds to a schematic cross-sectional view taken on broken line X1–X2–X4–X4' of FIG. 5. FIG. 4B is a cross-sectional view of a connecting part between a first conductive layer and a third conductive layer, and corresponds to a cross-sectional view taken on line 4B–4B' of FIG. 5. FIG. 5 is a top view of a part of the TFT-LCD 200 corresponding to one pixel.

The TFT-LCD 200 includes an additional insulating layer 52 between the first conductive layer 12 and the second conductive layer 17 of the TFT-LCD 100. Furthermore, in the TFT-LCD 200, the first conductive layer 12 is divided into two layers (areas) 12a and 12b. The first conductive layer 12a functions as a storage capacitor counter electrode of the storage capacitor 10a, and the first conductive layer 12b functions as a shielding layer for the TFT 20. These layers are formed as the divided layers (the conductive layer 12a and the shielding layer 12b) by forming the single first conductive layer 12 in the same manner as in Embodiment 1 and patterning the resultant layer.

Since the shielding layer 12b for covering at least a channel region of the TFT is thus divided from the conductive layer 12a functioning as the storage capacitor counter electrode, the potential of the storage capacitor counter electrode can be prevented from affecting the channel region of the TFT, so that the operation characteristic of the TFT can be stabilized. In the case where strong light does not enter the first conductive layer 12, however, the first conductive layer can be integrally formed as in the TFT-LCD 100 of Embodiment 1.

The insulating layer 52 covers a portion of the first conductive layer 12a exposed in the opening 14 so as to insulate the first conductive layer 12a and the second conductive layer 17 from each other. The first conductive layer 12a is electrically connected to the third conductive layer (as shown in FIG. 4B), and a counter voltage (common voltage) is applied to the first conductive layer 12a. Therefore, the insulating layer 52 works as the dielectric layer of the storage capacitor 10a.

The insulating layer 52 can be formed by depositing $SiO_2$ in a thickness of approximately 80 nm on substantially the entire surface of the substrate by, for example, the low pressure CVD between the procedures of FIGS. 3B and 3C in the fabrication method for the TFT-LCD 100 of Embodiment 1. Alternatively, the insulating layer 52 can be formed by oxidizing the surface of the second conductive layer 17 exposed in the opening 14. Further alternatively, the insulating layer 52 can be formed from a stacked layer film including $SiN/SiO_2$ or the like, or a film with a large dielectric constant such as $Ta_2O_5$. The insulating layer 52 may be formed merely between the first conductive layer 12a and the second conductive layer 17a, namely, merely on the portion of the first conductive layer 12a exposed in the opening 14, because it should function merely as the dielectric layer of the storage capacitor 10a.

From the viewpoint of the aperture ratio, the first conductive layer 12a and the third conductive layer 19a are preferably connected to each other in a position outside of the display region as is shown in FIG. 5. The electric connection between the first conductive layer 12a and the third conductive layer 19a is realized by, for example, the structure as shown in FIG. 4B. A contact hole 54 for exposing the third conductive layer 19a and a contact hole 56 for exposing the first conductive layer 12a are formed in an insulating layer 22. An electrode layer 24c is formed so as to be in contact with the first and third conductive layers 12a and 19a in the contact holes 54 and 56, respectively, thereby electrically connecting the first conductive layer 12a and the third conductive layer 19a to each other. The contact holes 54 and 56 can be formed, for example, in the procedure for forming the contact holes 23a and 23b described in Embodiment 1 with reference to FIG. 3G. The electrode layer 24c can be formed in the procedure for forming the source electrode 24a and the drain electrode 24b described also with reference to FIG. 3G. The electrode layer 24c is separated from the source electrode 24a and the drain electrode 24b, and the counter voltage is applied to the electrode layer 24c.

The storage capacitor 10a of the TFT-LCD 200 is formed from a stacked layer structure including the first conductive layer (first storage capacitor counter electrode) 12a, the insulating layer (first storage capacitor dielectric layer) 52, the second conductive layer (storage capacitor electrode) 17a, the second insulating layer (second storage capacitor dielectric layer) 18a and the third conductive layer (second storage capacitor counter electrode) 19a. In other words, the storage capacitor 10a is a capacitor resulting from connecting, in parallel, a capacitor formed from the first conductive layer (first storage capacitor counter electrode) 12a, the insulating layer (first storage capacitor dielectric layer) 52 and the second conductive layer (storage capacitor electrode) 17a and another capacitor formed from the second conductive layer (storage capacitor electrode) 17a, the second insulating layer (second storage capacitor dielectric layer) 18a and the third conductive layer. (second storage capacitor counter electrode) 19a. Accordingly, as compared with the structure of the storage capacitor 10 of the TFT-LCD 100 of Embodiment 1, the storage capacitor having the same capacitance value can be formed in a smaller area.

Assuming that each pixel has a size of 18 $\mu$m×18 $\mu$m and each of the first and second storage capacitor dielectric layers (silicon oxide) has a thickness of 80 nm, this TFT-LCD is compared with the comparative TFT-LCD in the area of the storage capacitor projected on the substrate surface (the hatched area in FIG. 5 or 2B) required for attaining a storage capacitance value Cs of 30 fF. The storage capacitor formed without the opening structure (trench structure) shown in FIG. 2B requires a projected area of approximately 70 $\mu m^2$, but in the structure of Embodiment 2 shown in FIG. 5 where the opening 14 with a width of 1 $\mu$m and a length of 17 $\mu$m is formed and the two capacitors are connected in parallel, the storage capacitance value of 30 fF can be attained with occupying a projected area of merely approximately 36 $\mu m^2$. When these TFT-LCDs are compared in the aperture ratio (corresponding to a ratio of an opening portion 15a (hatched portion) of FIG. 5 or 2B to the entire area of the pixel), the aperture ratio is approximately 42% in the structure of FIG. 2B but is approximately 51% in the structure of FIG. 5. In this manner, Embodiment 2 can attain a higher aperture ratio in addition to the effects attained by Embodiment 1.

As described in Embodiments 1 and 2, the aperture ratio of the liquid crystal display device can be improved and the variation in the capacitance value of the storage capacitor can be reduced according to this invention. In particular, the effects of the invention are remarkably exhibited in a compact, highly dense and highly refined TFT liquid crystal display device including a semiconductor layer of polysilicon. Particularly, the structure in which the first conductive layer is used as a shielding layer is suitably applied to a projection type liquid crystal display device in which strong light is used for irradiation.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention will fall within the true spirit and scope of the invention.

What is claimed is:

1. A liquid crystal display device including an insulating substrate, a thin film transistor formed on the insulating substrate, and a pixel electrode and a storage capacitor electrically connected to the thin film transistor, comprising:
   a first conductive layer formed on the insulating substrate;
   a first insulating layer formed on the first conductive layer and having an opening defined therein for exposing a part of the first conductive layer;

a second conductive layer formed on the first conductive layer at least within the opening;

a second insulating layer for covering the second conductive layer at least within the opening;

a third conductive layer for covering the second insulating layer at least within the opening;

a shielding layer formed over at least a channel of the thin film transistor;

wherein the storage capacitor is formed from a stacked layer structure including the second conductive layer, the second insulating layer and the third conductive layer; and wherein the shielding layer is formed from the same film as is used for forming the first conductive layer, but is electrically insulated from the first conductive layer.

2. The liquid crystal display device of claim 1, wherein the second conductive layer is in contact with the first conductive layer within the opening.

3. A liquid crystal display device including an insulating substrate, a thin film transistor formed on the insulating substrate, and a pixel electrode and a storage capacitor electrically connected to the thin film transistor, comprising:

a first conductive layer formed on the insulating substrate;

a first insulating layer formed on the first conductive layer and having an opening defined therein for exposing a part of the first conductive layer;

a second conductive layer formed on the first conductive layer at least within the opening;

a second insulating layer for covering the second conductive layer at least within the opening;

a third conductive layer for covering the second insulating layer at least within the opening;

a third insulating layer formed between the first conductive layer and the second conductive layer at least within the opening so that the first conductive layer and the second conductive layer are electrically insulated from each other;

wherein the storage capacitor is formed from a stacked layer structure including the second conductive layer, the second insulting layer and the third conductive layer.

4. The liquid crystal display device of claim 3, wherein the first conductive layer and the third conductive layer are electrically connected to each other, and the storage capacitor is formed from a stacked layer structure including the first conductive layer, the third insulating layer and the second conductive layer, and another stacked layer structure including the second conductive layer, the second insulating layer and the third conductive layer.

5. The liquid crystal display device of claim 4, wherein the first conductive layer and the third conductive layer are mutually connected within a contact hole formed in the first insulating layer in a position outside of a display region.

6. The liquid crystal display device of any of claim 1 or 3, further comprising a shielding layer formed over at least a channel of the thin film transistor, wherein the shielding layer and the first conductive layer are formed from the same film and are electrically insulated from each other.

7. The liquid crystal display device of any of claim 1 or 3, wherein a gate insulating layer of the thin film transistor is formed from a film the same as a film used for forming the second insulating layer.

8. The liquid crystal display device of any of claim 1 or 3, wherein a channel, a source and a drain of the thin film transistor are formed in a film the same as a film used for forming the second conductive layer.

9. The liquid crystal display device of any of claim 1 or 3, wherein a gate electrode of the thin film transistor is formed from a film the same as a film used for forming the third conductive layer.

10. A method of fabricating a liquid crystal display device including an insulating substrate, a thin film transistor formed on the insulating substrate, and a pixel electrode and a storage capacitor electrically connected to the thin film transistor, the method comprising:

on the insulating substrate, forming a first conductive layer and a shielding layer to be formed over at least a channel of the thin film transistor from the same film and so that the first conductive layer and the shielding layer formed from the same film are electrically insulated from one another;

forming a first insulating layer on at least part of the first conductive layer and on at least part of the shielding layer;

forming an opening for exposing a part of the first conductive layer in the first insulating layer by etching the first insulating layer with the first conductive layer used as an etch-stop layer;

forming a second conductive layer on the first conductive layer at least within the opening;

forming a second insulating layer for covering at least part of the second conductive layer; and forming a third conductive layer for covering the second insulating layer at least within the opening, wherein the storage capacitor is formed from a stacked layer structure including the second conductive layer, the second insulating layer and the third conductive layer.

11. A method of fabricating a liquid crystal display device including an insulating substrate, a thin film transistor formed on the insulating substrate, and a pixel electrode and a storage capacitor electrically connected to the thin film transistor, the method comprising:

forming a first conductive layer on the insulating substrate;

forming a first insulating layer on at least part of the first conductive layer;

forming an opening for exposing a part of the first conductive layer in the first insulating layer by etching the first insulating layer with the first conductive layer used as an etch-stop layer;

forming a second conductive layer on the first conductive layer at least within the opening;

forming a second insulating layer for covering at least part of the second conductive layer; and forming a third conductive layer for covering the second insulating layer at least within the opening, forming, between the first conductive layer and the second conductive layer, a third insulating layer for electrically insulating the first conductive layer and the second conductive layer from each other in the opening; and electrically connecting the first conductive layer and the third conductive layer to each other, wherein the storage capacitor is formed from a stacked layer structure including the first conductive layer, the third insulating layer and the second conductive layer, and a stacked layer structure including the second conductive layer, the second insulating layer and the third conductive layer.

12. The method of claim 10, wherein the first and second conductive layers contact one another within the opening.

* * * * *